United States Patent [19]
Pitner

[11] 3,890,854
[45] June 24, 1975

[54] ROLLING BEARING ASSEMBLY, IN PARTICULAR FOR A STEERING SHAFT OF AN AUTOMOBILE VEHICLE

[75] Inventor: Alfred Pitner, Paris, France

[73] Assignee: Nadella, France; a part interest

[22] Filed: June 14, 1973

[21] Appl. No.: 369,842

[30] Foreign Application Priority Data
June 26, 1972 France................................ 72.23014

[52] U.S. Cl. ............................... 74/492; 308/184 R
[51] Int. Cl. ..... B62d 1/18; F16c 27/04; F16c 35/04
[58] Field of Search..................... 74/492; 308/184 R

[56] References Cited
UNITED STATES PATENTS

| | | | |
|---|---|---|---|
| 642,704 | 2/1900 | Miller | 308/184 X |
| 1,434,855 | 11/1922 | Stamm et al. | 308/184 R |
| 2,188,862 | 1/1940 | Horger | 308/184 R |
| 2,282,161 | 5/1942 | Brauer | 308/184 R X |
| 2,283,839 | 5/1942 | Wright | 308/184 R |
| 3,348,289 | 10/1967 | Marsh | 308/184 R X |
| 3,461,740 | 8/1969 | Tajima et al. | 74/492 |

FOREIGN PATENTS OR APPLICATIONS

| | | | |
|---|---|---|---|
| 712,677 | 7/1931 | France | 308/184 |
| 1,330,269 | 5/1963 | France | 308/184 R |

*Primary Examiner*—Allan D. Herrmann
*Attorney, Agent, or Firm*—Robert E. Burns; Emmanuel J. Lobato; Bruce L. Adams

[57] ABSTRACT

In the assembly the needle bearing is mounted within an elastically yieldable collar which is engaged in a ring whose radial flanges or side walls define two cylindrical abutment surfaces which on normal operation define a radical clearance with the surface of the shaft.

Normal operational loads are absorbed by the collar. When an abnormal load occurs, for example due to a thrust exerted by the driver on the steering wheel, the shaft bears against the abutment surfaces so that the collar is protected from any deformation which might impair it.

10 Claims, 6 Drawing Figures

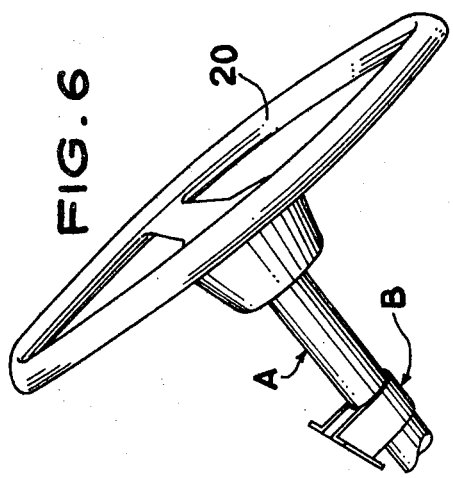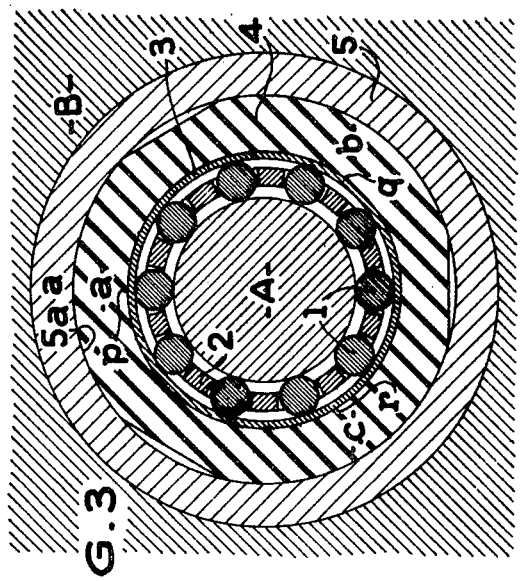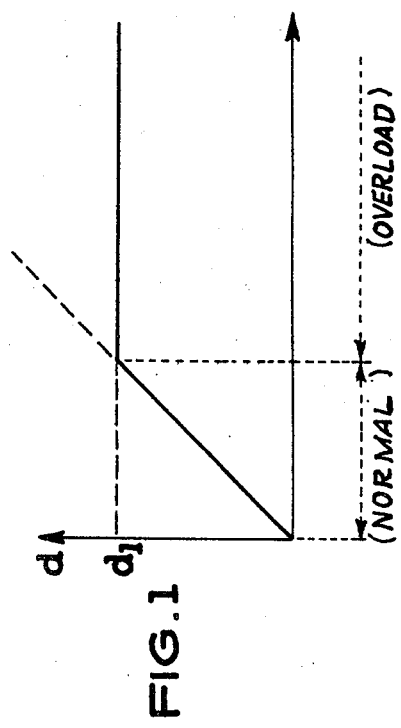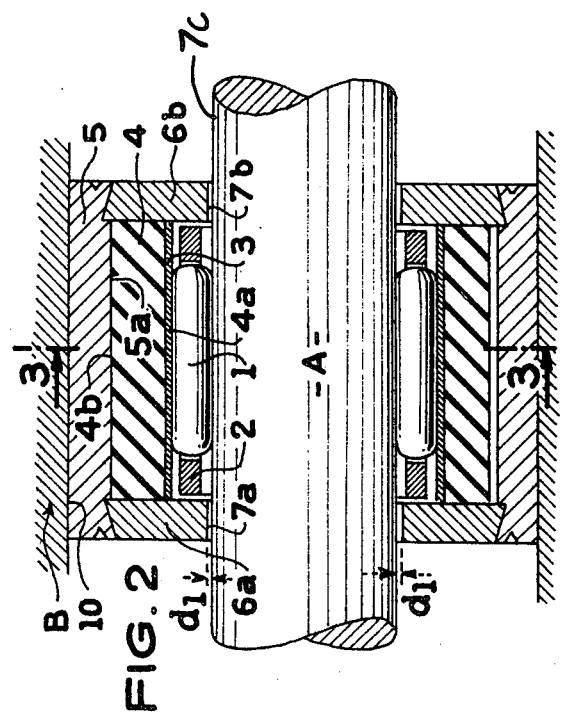

ROLLING BEARING ASSEMBLY, IN PARTICULAR FOR A STEERING SHAFT OF AN AUTOMOBILE VEHICLE

The present invention relates to a rolling bearing assembly comprising a mount, a shaft within the mount, a thin sleeve mounted inside a bore of the mount with interposition of at least one elastically yieldable support, the inner surface of the sleeve defining one of the raceways for a ring arrangement of needles or rollers, the other raceway of which arrangement is constituted by the surface of the shaft or by a cylindrical member fitted on the latter.

By way of a non-limitative example, such a mount may be employed in the mounting of a steering shaft of an automobile vehicle.

Such an assembly has the advantage, resulting from the presence of the elastically yieldable support or supports, of absorbing vibrations produced by the shaft which permits increasing the comfort of the driver in the abovementioned application to a steering wheel. However, in the case of a large static overload produced for example when the driver bears on the steering wheel with all his weight, the elastically yieldable support or supports may be impaired and cause the shaft to float to an undesirable extent in its mount.

In order to avoid such a disadvantage, an object of the present invention is to provide an assembly in which the elastic deformation of the support or supports is limited. More precisely, if there is employed the notion of the characteristic curve of a spring under compression shown in FIG. 1 of the accompanying drawings, it is desired to obtain, first, a roughly linear deformation and then, after a certain load, a deformation which remains roughly constant.

The invention provides an assembly wherein at least one fixed cylindrical abutment surface concentric with the bore of the mount, which bore is cylindrical, is co-operable with a part of the shaft or with a mechanical unit of which the shaft forms part, the shaft or unit being radially movable with respect to the cylindrical surface and capable of abutting said cylindrical surface when the amplitude of the radial displacement of said shaft or unit reaches a predetermined value.

The prior art as shown by U.S. Pat. No. 2,188,862 and British Pat. No. 298,127 discloses an assembly comprising a rolling bearing, whose outer ring is thick, with an arrangement which is such that, in the case of exceptional and violent force, a collar of elastically yieldable material is compressed so as to allow the ring to bear on the mount whereas the shaft continues to rotate. The arrangement according to the invention differs from this arrangement in that the shaft subjected to an exceptional force does not rotate so that any deterioration of the rolling bearing is avoided when it is shifted away by compression of the elastically yieldable support or supports.

With the arrangement according to the invention, when the rolling bearing is in normal operation, the elastically yieldable support or supports are stressed in the part of the characteristic curve (FIG. 1) which has a certain slope (normal operating zone) whereas in the case of overload (overload zone) the horizontal part of the characteristic curve is operative owing to the fact that contact of the shaft with the abutment surface prevents any increase in the deformation of the support or supports.

Two cylindrical abutment surfaces are advantageously provided which are constituted by edge portions which define an inner opening of two radial side walls which axially retain the needles or rolling elements and are formed or fixed on the portion defining the bore of the mount or on a ring interposed between the bore and a collar of elastomer constituting a single support for the thin sleeve.

The elastically yieldable support or supports may define, in accordance with the teaching of French Pat. No. 1,507,257, three angularly spaced regions where the clearance for the circulation of the needles or rollers is reduced or zero.

The invention will be described by way of example in the ensuing description with reference to the accompanying drawing, in which:

FIG. 1 has been mentioned hereinbefore;

FIG. 2 is an axial sectional view of a mount in which a steering shaft is journalled;

FIG. 3 is a cross-sectional view taken on line 3—3 of FIG. 2;

FIG. 6 is a perspective view of the upper part of a steering shaft provided with a mount of the type shown in FIGS. 2 and 3.

Figure 5:
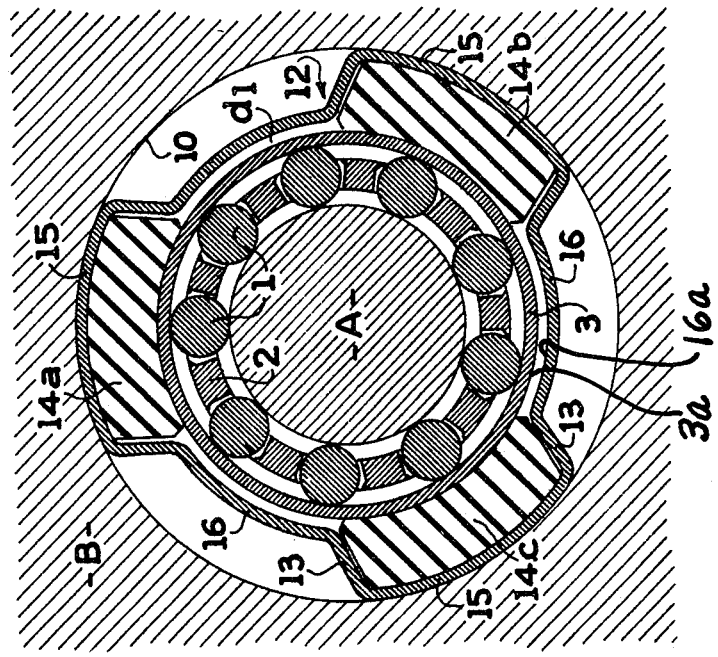
FIGS. 4 and 5 are respectively an axial sectional view and a cross-sectional view of modifications of an assembly according to the invention.

FIG. 2 is an axial sectional view of a needle bearing mounted in accordance with the invention about a steering shaft A and engaged in a cavity defined by a mount B. The needles 1 guided by a cage 2 have the surface of the shaft A as an inner raceway and the inner surface of a sleeve 3 of thin sheet metal for an outer raceway, the thickness of the sleeve being less than the diameter of the needles. This sleeve has a length which is roughly the same as the length of the cage 2 and is engaged in the inner bore of a collar 4 of elastomer whose peripheral outer surface 4b bears in the inner surface 5a of a thick ring 5 which is a drive fit in a cylindrical wall 10 formed in the mount B. Secured at the respective ends of the ring are two washers 6a, 6b, constituting two radial end walls integral with the ring.

According to the teaching of French Pat. No. 1,507,257 and as shown in FIG. 3, the elastically yieldable collar 4 comprises in the free state three regions of extra thickness which, upon contact with the bore 5a of the ring 5 are deformed inwardly at a, b, c and simultaneously deform inwardly the sleeve 3 in the regions p, q, r and thus reduce, or tend to render negative, the annular clearance for the circulation of the needles 1. However, owing to the elasticity of the support regions p, q, r, the needles can, when passing through the latter, deform the regions a, b, c of the sleeve in the opposite direction so that any dangerous stress is avoided. An assembly of this type enables variations in the dimensions, unavoidable in mass production, to be easily accommodated.

The inner cylindrical opening defined by the edge portions 7a, 7b of the two radial side walls 6a, 6b has a diameter equal to the diameter of the shaft plus twice the maximum static radial deformation $d_1$ which the collar 4 can undergo before the elastomer is impaired. The edge portions 7a, 7b constitute first abutment surfaces and the surface 7c of the shaft A constitutes a second abutment surface cooperative with the first abutment surfaces.

When the rolling bearing operates under normal operational conditions, it is centered by the collar 4. When it is abnormally stressed by a radial force, the shaft A bears against the cylindrical abutment or surface 7a, 7b defined by the side walls 6a and 6b which protect the collar 4 from any dangerous deformation.

Figure 4:
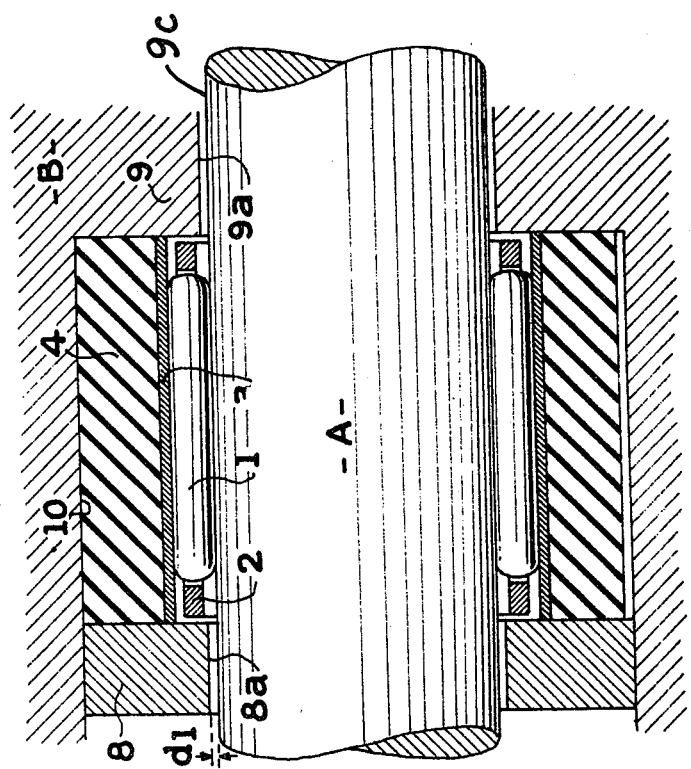

FIG. 4 shows a modification of the assembly shown in FIG. 2 in which the mount B has a cavity provided with a shoulder 9 which, in performing the same function as the side wall 6b shown in FIG. 2, allows the shaft A to pass therethrough with a small clearance $d_1$ which is equal to that which exists at the other end in the region of a thick washer 8 which has been placed in position, for example at low temperature, in the bore 10 of the mount so that it is tightly engaged in the cavity without being able to escape from the cavity at normal temperature of operation. Provided between the thick washer 8 and the shoulder 9 of the cavity is an arrangement identical to that shown in FIG. 2 comprising an elastomer collar 4, a thin sleeve 3 and a cage 2 for needles 1. When the shaft A rotates normally in its cavity, or housing, the needles 1 guide the shaft owing to the three prestressed regions defined on the sleeve 3 for the ring arrangement of needles by the collar 4. When a radial overload is accidently exerted on the shaft A, the surface 9c of the shaft bears on the inner cylindrical surfaces 8a and 9a of the washer 8 and shoulder 9 respectively.

FIG. 5 shows a rolling bearing assembly according to the invention comprising three elastomer supports 14a, 14b, 14c which constitute segments of a cylinder of identical circumferential extent against which a thin sleeve 3 bears whose inner surface acts as an outer raceway for needles 1 guided by the cage 2 around the shaft 3 and whose outer surface 3a constitutes an abutment surface. The three supports 14a, 14b, 14c are maintained spaced apart by a case 12 of thin sheet metal which defines in the region of the supports 14a, 14b, 14c, a segment of a cylinder 15 which bears against the surface of the bore 10 machined in the mount B and which conforms to the shape of these supports and includes portions 13 which are substantially parallel to a radial plane of the bearing assembly and are interconnected by segments of a cylinder 16 which define abutment surfaces 16a which are concentric with the shaft A and spaced from the outer surface 3a of the thin sleeve 3 a distance $d_1$ so that, when the shaft is subjected to a radial overload, the surface 3a of the sleeve 3 abuts these surfaces 16a. The three supports 14a, 14b, 14c define, as in FIGS. 2 and 3, three regions in which the clearance for the circulation of the needles 1 is zero.

FIG. 6 shows the upper part of a steering shaft A which carries the steering wheel 20 and is journalled in a mount B fixed to the body of the vehicle (not shown) by a needle bearing assembly of the type shown in FIGS. 2 and 3.

It will be observed that if the mount B is sufficiently rigid, the thick ring 5 shown in FIGS. 2 and 3 may be replaced by a thin sleeve, in which case the radial side walls 6a, 6b would be, for example, maintained in position by an annular flange on the sleeve engaged in a radial recess in the side walls. The function of the sleeve is then to afford a unit comprising the collar of elastomer, the needle bearing, and the two end walls, it being possible to mount this unit in a single operation after a handling which is made easier.

Having now described my invention what I claim as new and desire to secure by Letters Patent is:

1. A vehicle steering assembly for orienting steering road wheels of the vehicle comprising a steering wheel for the driver of the vehicle, a steering shaft carrying said steering wheel and a rolling bearing assembly comprising means defining a rolling bearing inner raceway associated with said shaft, a ring arrangement of rolling elements around the raceway, a steering wheel shaft mount for connection to the body of the vehicle, said mount defining a bore, a thin sleeve located within the bore and defining an outer raceway for the rolling elements, elastically yieldable support means interposed between the sleeve and the bore for radially supporting the sleeve in an elastically yieldable manner with respect to the bore, means defining at least one first abutment surface of cylindrical shape coaxial with the inner raceway and associated with the bore, means defining a second abutment surface associated and radially movable with the shaft, the elastically yieldable support means being capable of elastically yielding to a given maximum radial extent after which extent impairment of the elastically yieldable support means occurs, and the radial distance between said first and second abutment surfaces being less than said maximum radial extent of said elastic yield to preclude impairment of said elastically yieldable support means but sufficient to allow said shaft radial movements relative to said mount, in opposition to the action of said elastically yieldable support means, which are brought about by vibrations and forces normally to be expected in vehicle use, whereby said elastically yieldable support means are protected from impairment by the effect of abnormal forces on said shaft.

2. An assembly as claimed in claim 1, wherein the means defining the first abutment surface comprises a washer carried by the means defining the bore and having a cylindrical inner edge constituting the first abutment surface.

3. An assembly as claimed in claim 1, comprising a ring interposed between and in engagement with the elastically yieldable support and the bore and a radially extending end wall integral with the ring and having an inner edge constituting said first abutment surface.

4. An assembly as claimed in claim 1, wherein two of said first abutment surfaces of cylindrical shape are provided in axially spaced relation to each other at opposite ends of the raceways.

5. An assembly as claimed in claim 1 wherein means defining an annular shoulder which is coaxial with the means defining the bore defines said first abutment surface.

6. An assembly as claimed in claim 1, wherein the elastically yieldable support comprises a collar of elastomer coaxial with the raceways.

7. An assembly as claimed in claim 1, wherein a plurality of angularly spaced regions of the yieldable support means are in a state of radial compression whereby the sleeve has a plurality of radially inwardly deformed portions which define with the inner raceway a radial space for the circulation of the rolling elements which is reduced relative to the radial space defined by the remainder of the sleeve, said deformed portions of the sleeve being however capable of radially outwardly yielding upon passage of the rolling elements through said reduced radial spaces so that the stresses on the rolling elements remain low.

8. A vehicle steering assembly for orienting steering road wheels of the vehicle comprising a steering wheel for the driver of the vehicle, a steering shaft carrying said steering wheel and a rolling bearing assembly comprising means defining a rolling bearing inner raceway associated with the shaft, a ring arrangement of rolling elements around the raceway, a steering wheel shaft mount for connection to the body of the vehicle, said mount defining a bore, a thin sleeve located within the bore and defining an outer raceway for the rolling elements, a thin sheet metal case engaged in the bore and defining a plurality of angularly spaced part-cylindrical abutment surfaces, a plurality of supports of elastomer interposed between and engaged with the case and the sleeve in alternating relation to the abutment surfaces for radially supporting the sleeve in an elastically yieldable manner relative to the case, the abutment surfaces being radially spaced from the sleeve in substantially coaxial relation to the sleeve when the shaft is in a state of rest relative to the bore, the elastomer supports being capable of elastically yielding to a given maximum radial extent after which extent impairment of the elastomer supports occurs, and said radial spacing between said sleeve and said abutment surfaces being less than said maximum radial extent of said elastic yield to preclude impairment of said elastomer supports but sufficient to allow said sleeve and said shaft radial movements relative to said mount, in opposition to the action of said elastomer supports, which are brought about by vibrations and forces normally to be expected in vehicle use, whereby said elastomer supports are protected from impairment by the effect of abnormal forces on said shaft.

9. An assembly as claimed in claim 8, wherein there are three of said abutment surfaces and three of said supports of elastomer.

10. An assembly as claimed in claim 9, wherein said supprots of elastomer are in a state of radial compression whereby the sleeve has a plurality of radially inwardly deformed portions which define with the inner raceway a radial space for the circulation of the rolling elements which is reduced relative to the radial space defined by the remainder of the sleeve, said deformed portions of the sleeve being however capable of radially outwardly yielding upon passage of the rolling elements through said reduced radial spaces so that the stresses on the rolling elements remain low.

* * * * *